US006626619B1

(12) United States Patent
Exnowski et al.

(10) Patent No.: US 6,626,619 B1
(45) Date of Patent: Sep. 30, 2003

(54) LOW PLATFORM RAILWAY CAR FOR GLASS STANDS

(75) Inventors: Jürgen Exnowski, Schwerte (DE); Karl-Heinz Kapteina, Ahaus-Wüllen (DE); Friedrich Welsch, Gladbeck (DE); Kees Van Noordt, Osstvoome (NL)

(73) Assignees: Spedition Hubert Winnen GmbH & Co. KG, Gladbeck (DE); Nijman/Zeetank Internationale Transporten B.V., Spijkenisse (NL)

( * ) Notice: Subject to any disclaimer, the term of this patent is extended or adjusted under 35 U.S.C. 154(b) by 0 days.

(21) Appl. No.: 09/857,167

(22) PCT Filed: Nov. 28, 1999

(86) PCT No.: PCT/DE99/03860
§ 371 (c)(1),
(2), (4) Date: Aug. 1, 2001

(87) PCT Pub. No.: WO00/32457
PCT Pub. Date: Jun. 8, 2000

(30) Foreign Application Priority Data

Dec. 3, 1998 (DE) .......................................... 198 55 733

(51) Int. Cl.[7] .................................................. B60P 7/10
(52) U.S. Cl. ............................ 410/35; 410/32; 410/34; 410/38; 410/66; 410/128
(58) Field of Search .............................. 410/31, 32, 34, 410/35, 38, 46, 66, 127, 128; 105/355; 211/72, 169, 169.1, 198, 41; 206/451, 454; 296/3

(56) References Cited

U.S. PATENT DOCUMENTS

| 3,235,285 | A | | 2/1966 | Tenenbaum et al. | |
| 4,248,472 | A | | 2/1981 | Brown et al. | |
| 4,360,298 | A | * | 11/1982 | Fischer et al. | 410/32 |
| 4,385,856 | A | * | 5/1983 | O'Neal | 410/34 |
| 4,545,710 | A | * | 10/1985 | Hepp | 410/32 |
| 4,688,976 | A | * | 8/1987 | Rowley et al. | 410/156 |
| 5,114,288 | A | * | 5/1992 | Langendorf et al. | 410/34 |
| 5,378,093 | A | * | 1/1995 | Schroeder | 410/32 |
| 5,511,491 | A | | 4/1996 | Hesch et al. | |
| 5,582,495 | A | * | 12/1996 | Schroeder | 410/32 |
| 6,270,299 | B1 | * | 8/2001 | Rehbein | 410/41 |

FOREIGN PATENT DOCUMENTS

| DE | 3516914 | 11/1986 |
| EP | 0461448 | 12/1991 |
| EP | 0463505 | 1/1992 |
| EP | 0548037 | 6/1993 |
| EP | 0672566 | 9/1995 |
| EP | 0924130 | 6/1999 |

* cited by examiner

Primary Examiner—Stephen T. Gordon
(74) Attorney, Agent, or Firm—James Creighton Way; Meera P. Narasimhan

(57) ABSTRACT

The invention relates to a transport vehicle which serves to transport objects having large dimensions, especially glass stands. The transport vehicle is provided, as a low-platform railway car, with a traversal loading area. This loading area and the loading ramps assigned thereto form a travelling surface for so-called Osila glass transport vehicles, whereby the loading area is protected against soiling in an overall manner by a structure, and the load is secured on the loading area by stand fixing devices and load securing devices.

20 Claims, 4 Drawing Sheets

LOW PLATFORM RAILWAY CAR FOR GLASS STANDS

BACKGROUND OF THE INVENTION

The invention relates to a transport vehicle for the transport of objects having large dimensions, especially low-platform railway cars which feature a long loading area that is built to fit the measurements of the rails and which also features low-set steering controls which are set in a distance to each other. The long loading area is bounded by a loading board on both sides and on its head side it features a connecting loading ramp which allows a short coupling with other low-platform railway cars.

Such transport vehicles could either be railway cars or freight trucks to transport glass sheet packages that measure a length of more than 6 meters and a height of more than 3 meters. Those glass sheet packages are set in an angle against an A-shaped or L-shaped glass stand and then they are taken by the especially designed transport vehicle. With freight trucks it is customary to arrange for U-shaped longitudinal carriers on the floor to correspond with the glass stands. The longitudinal carriers are shaped to also correspond with the according longitudinal carrier elements of the freight truck so that they can be loaded during, or better, after lowering the back part of the freight truck. Air bellows that correspond with the wheels are used for lifting or lowering, in order to lift and lower the back part of the freight truck towards the wheels. The corresponding longitudinal carriers on the frame feature fixating fixtures or stand fixing devices in order to support the glass stands which are set inside the freight truck or the glass sheet packages that rest upon the stands. Those fixtures are known from the DE-OS 35 16 914.1 whereas here, parallelogram struts are used which can be moved via a hydraulic cylinder. A disadvantage of those freight trucks is that they are road vehicles which can put pressure on the environment. Furthermore, practically only interior loading equipment in connection with an articulated vehicle can be used that are only suitable for the transport of such glass stands. As stated, such loading gear has limited use for transporting other goods or cannot be used for other goods at all. To comply with general efforts to transfer as many transports as possible onto the rail, low-platform railway cars were developed which can also transport freight trucks. Those freight trucks can be loaded with various goods including in theory articulated equipment with connected interior loading gear. If such low-platform railway cars shall receive or be loaded directly with those glass stands it is compulsorily necessary that these glass stands are loaded onto the railway cars by cranes in order to transport them. Such glass stands can move and lose their position during the transport, in other words, while the railway car is moving, so that they are very much in danger. A special problem results from the fact that only A-shaped glass stands can be used in order to avoid slipping and an imbalanced loading of the low-platform railway cars. L-shaped glass stands, which by nature cause an imbalanced loading of a wagon, cannot be used although the glass industry uses more and more of those L-shaped glass stands. As previously stated, it is especially disadvantageous that crane-type equipment is always necessary for loading, which might be available at the glassworks but in most cases not at the location of the buyer of such glass sheets. The EP-0548037-A1 shows a railway car with a completely over-all enclosed structure. Via roller construction it is possible to lift and lower the fold bellows. It is disadvantageous because it makes it difficult to drive through the area between two wagons and even makes it impossible for a vehicle that transports glass sheets. This is also true for the convoy of vehicles according to U.S. Pat. No. 5,511,491. Even though it is stated in the EP-0 463 505 A1 that the roof shall be constructed so that it can be raised, but that only concerns railway cars which are to transport cars on two levels. Once the upper level is occupied, the roof can be lowered again. A fixation of the cargo is not intended. The EP 0 672 566 A1 however shows a low-platform railway car for the transport of freight trucks. The roof structure can be widened to drive in or for loading in order to facilitate the loading process especially the driving onto the railway car. Objects with large dimensions, above all, glass stands cannot be transported, and in particular specialized vehicles cannot unload and pick up glass stands. The solutions according to U.S. Pat. Nos. 3,235,285 and 4,248,472 as well as EP 0 461 448 A1 also show only details concerning a roof that can be raised. The railway vehicle according to EP 0 924 130 A2 requires a separate crane in order to set the glass stand with the glass sheets onto the loading area. This results in considerable problems and disadvantages.

SUMMARY OF THE INVENTION

The invention therefore has the task to create a transport vehicle which can be loaded with objects having large dimensions and with that in particular transport stands for glass sheets without requiring a crane.

The task is solved according to the invention through the disclosed characteristics.

Because of the special construction of the transport vehicle it is possible to drive onto the entire loading area, to set the individual glass stands, regardless whether it is an A-shaped or a L-shaped glass stand, unto the loading area and to secure them there in such a fashion that the glass stands as well as the cargo, meaning the glass sheets, are secured during the transport. This could be a low-platform railway car as well as a low loading car which is accessible for specially equipped vehicles to drive onto, in this case Osila-glass-transport vehicles, in order to unload the glass stands as described and to secure them afterwards. It is especially advantageous that the loading as well as the unloading can be done without a crane, while the Osila-glass-transport vehicles are special equipment which are available at the glassworks because they are required for internal transport. They can also be used without a problem at the buyer's location because they are usually available there, whereas for precautionary measures a large transport with multiple low-platform railway cars could also include an appropriate Osila-glass-transport vehicle which would be part of the transport and can therefore take care of the loading and unloading of the glass stands at the destination points. With this, a very versatile procedure or transport vehicle has been created, which, no matter whether it is a railway vehicle or a road vehicle, can be used for the specified tasks without requiring elaborate cranes or similar equipment. Due to the reinforcement boards which run in longitudinal direction an overloading of the actual loading area is ruled out or, in other words, it is not necessary to make the entire loading area appropriately stable which would make the loading of goods more difficult. Those reinforcement boards furthermore are designed in such a manner that a sliding of the glass stands on them and a sliding of the glass stands with the reinforcement boards is difficult, or better, impossible. A loading process with a standard osila-glass-transport vehicle with its elevated driver booth is advantageously possible because the structure that rests on the loading area features a roof that can be raised. During the loading of the loading area the roof will be raised accordingly so that the Osila-glass-transport vehicles can, without a problem, drive the glass stands cross the loading area and place them there. When the loading process is completed, the roof will be lowered and you are looking at an advantageously designed low-platform railway car or low-loader. The side walls are stabilized and connected with the loading area, or better, with the loading board in such a manner that they can be used as a bearing for the fixtures that are securing the loaded goods. Thus the side walls can, for example, be set in appropriate load-retaining stanchions in the loading board or be connected with it in another way in order to transfer the necessary force. It is also thinkable that there would be stands intended to stabilize the side walls which would rest on the diagonal carriers of the loading area thus representing the bearing for the actual load securing devices.

An especially advantageous design of such a bearing based on its limited space requirements would be such that the sidewalls, the roof and the loading area in regards of the required bearing for the load securing devices are coupled with each other to build one unit. The side walls, the roof and the loading area practically build rings on which the load securing devices can rest when they have been pushed against the glass sheet packages in order to effectively protect them during the transport.

Another useful design is such that the fittings to fixate the stands are air or hydraulic cylinders, which are able to swivel round and which are set on the lower loading board and rest on an U-shaped longitudinal carrier of the glass stand. The stand fixing devices prevent the glass stands from sliding back and forth on the loading area thus taking advantage of the U-shaped longitudinal carriers of the glass stands which are suited for the transport within the facility as well as the transport with the inner loaders. Furthermore, the stand fixing devices can also rest on the loading board or be attached to it so that they can be swiveled out of the way or moved up during the loading process. Because air or hydraulic cylinders are used, the space requirements are minimal whereas the air cylinders can take advantage of the pressurized air that is available on such low-platform railway cars or also on low-loaders.

If there is no pressurized air and no hydraulic pressure available, the fixation of the glass stands can take place mechanically for which the invention intends that the stand fixing devices are shaped as double wedges which can be fitted in U-shaped spaces in the loading board and in the glass stand or, in better words, can be braced between the two. Here, it is also thinkable that those double wedges feature a spring mechanism to achieve an additional bracing when put in place. Because the stands shall be transported with the Osila-glass-transport vehicles, the fixation can be facilitate for example via the Osila-glass-transport vehicles when those pull the double wedges into their bracing position so that the glass stands are loaded via the Osila-glass-transport vehicle.

In order to only raise the part of the roof under which the work takes place, it is advantageous that the roof of the structure is designed so that it can be raised in segments. Two glass transport stands can be set on common low-platform railway cars so that only half of the roof of such a low-platform railway car is raised during the loading process where as the other part remains in its low position.

A quasi automatic raising of the roof will be achieved by the fact that it features loading ramps that are fit to correspond with the Osila-glass-transport vehicles. The osila-glass-transport vehicle as well as the actual railway car, or better its roof, contain additional components that bring a quasi automatic raise of the roof when the Osila-glass-transport vehicles drives onto the loading area of the transport vehicle. Separate components to raise and lower the roof are therefore no longer necessary.

The individual low-platform railway cars or low loaders shall also be protected from the environment as a one unit convoy to avoid a soiling of the transported glass panes. For this reason, the loading area and the structure above it build a sealing unit as previously stated whereas the structure also seals against the environment. Due to the short couplings the individual cars can be closely coupled whereas the area between the cars that build the convoy can also be sealed in such a way that the low-platform railway cars are connected with each other with accordion shaped covers. This has the advantage that even during the transport you can walk or even drive from the loading area from one car to the other without making it necessary to close off the cars from each other. Even in curves, the enclosure is ensured, because this part is shaped like an accordion. The entire train therefore builds one complete even climatically controlled unit so that even highly sensitive glass can be transported from one plant to the other or from one place to the other.

The invention features special characteristics due to the fact that a transport vehicle or a type of transport vehicle has been created that can be advantageously loaded with glass stands without requiring cranes or similar loading aids. For loading or unloading, so-called Osila-glass-transport vehicles can be utilized advantageously, since they are used anyway within the plants and which bring the common A-shaped and also L-shaped glass stands onto the especially designed loading area where they are set into fittings that fixate and secure the stands in such a way that even over long transport distances damages to the appropriately fixated glass panes do not have to be feared. Based on the special features of the low-platform railway cars or also the low loaders they can also be used for the transport of other goods with large dimensions whereas again there is the advantage that the cargo as well as the transport fixtures or glass stands as such can be fixated and held on the loading area so that they cannot leave their intended position during the transport, on the other hand, they are set and fixated in a way that they survive curves as well as jerky transports without a problem.

Additional details and advantages of the invented object can be found in the following description of the corresponding drawings where a preferred design example is depicted with the necessary details and individual parts.

It is shown in:

BRIEF DESCRIPTION OF THE DRAWINGS

FIG. 4: a back view onto a low-platform railway car which is loaded with an Osila-glass-transport vehicle and.

DETAILED DESCRIPTION OF THE PREFERRED EMBODIMENTS

Figure 1:
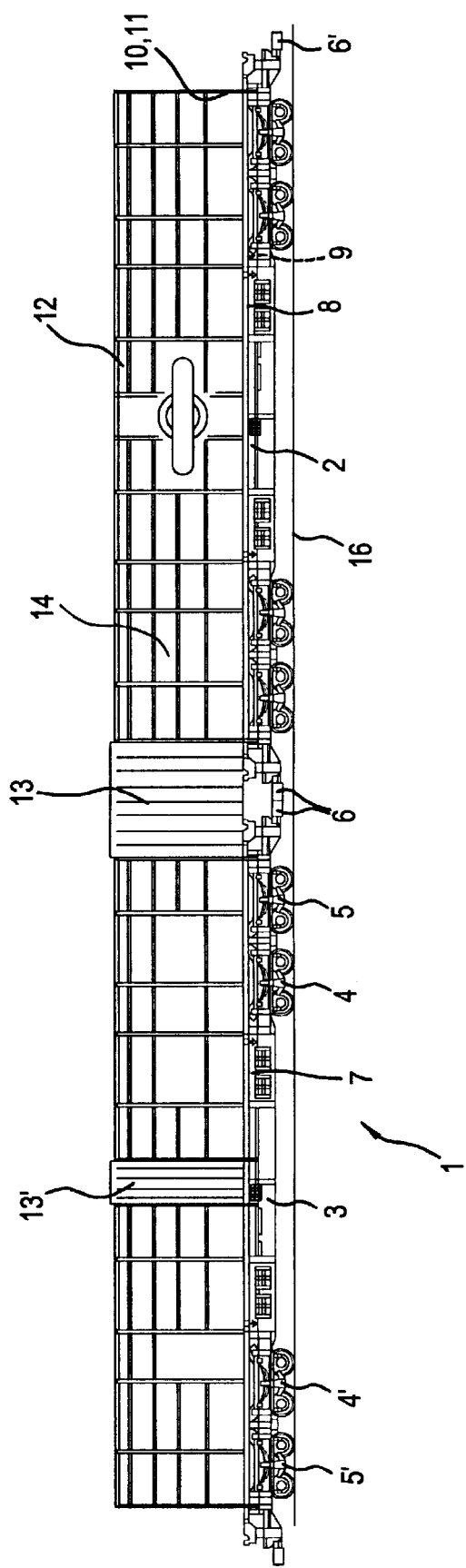
FIG. 1: two coupled low-platform railway cars viewed from the side.

FIG. 1 shows a transport vehicle 1 which is a low-platform railway car 2, 3, which features steering controls 4, 5 and which are connected with each other via a short coupling 6, 6' in such a way that its loading areas 7 are quasi be accessed and loaded as one section. Appropriate panels or loading ramps are set between the loading areas 7 so that it is entirely possible to be entered by a vehicle via appropriate transport gear.

On the side of the loading area 7 loading boards 8 are intended as can be seen on the following pictures. Those loading boards 8, 9 are complemented by side walls 10, 11 and they are connected on top by a roof 12 which in all creates a stable structure 14. This structure 14 is complemented between the loading areas 7 and the side walls 10, 11 as well as the roof 12 by an accordion type shaped cover 13, 13' to safeguard this space in between and to "seal" it. In the event that the individual low-platform railway car 3 is divided into various compartments 17, 18, an accordion-type shaped cover 13, 13' might be useful in order to ensure a complete seal of the inner compartment. With that, the space above the rails 16 should also be enclosed to avoid a soiling of the transported glass stands.

Figure 2:
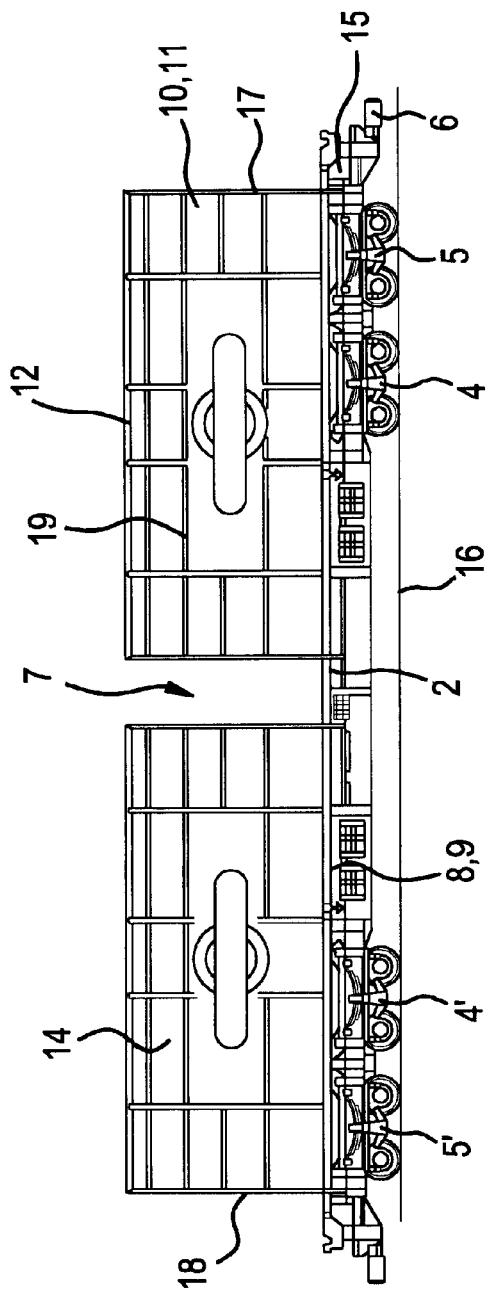
FIG. 2: an individual low-platform railway car viewed from the side on which two glass stands have been set.

FIG. 2 shows a low-platform railway car 2 viewed from the side where it becomes clear that here, the low-platform railway car 2 is divided into two compartments 17, 18 which are both loaded with corresponding glass stands which cannot be seen due to the cover. On the outside of the cover 19 you can see lettering, so that those surfaces can also be used for advertising.

Here, the individual low-platform railway car 2 features two steering controls each 4, 5, 4", 5'. Thus, even with a great length, it can follow even a small rail radius whereas the rail 16 is only briefly indicated.

Figure 3:
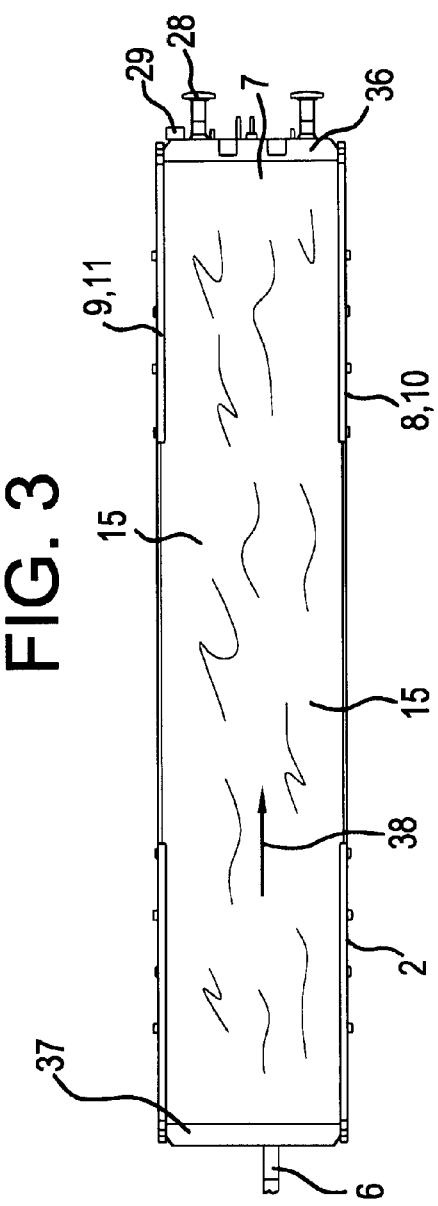
FIG. 3: a bird's eyes view onto a low-platform railway car.

FIG. 3 shows a bird's eyes view onto a low-platform railway car 2, which is equipped with short couplings 6; the common buffers 28 are at least intended where a coupling onto the pulling engine is necessary. Otherwise, the shown short couplings 6 are sufficient. FIG. 3 also indicates a stepping board 29 like it is customary with such low-platform railway cars 2.

Interesting is the large loading area 7 on which the traveling surface 15 is visible which is used by the Osila-glass-transport vehicles which are not shown here, as well as to receive the glass stands which are also not depicted. On the side, the loading area 7 is lined by loading boards 8, 9 while the front and back part features segments 36, 37 onto which loading ramps can be placed, which are also not shown, to make the loading area accessible and drivable for the previously referenced Osila-glass-transport vehicles. Especially the spaces between the individual low-platform railway cars 2, 3 can be bridged in such a way that the aligned low-platform railway cars 2, 3 can be loaded from one loading area. Thus, the loading takes place in longitudinal direction 38 without the necessity to move the goods from sideway loading ramps or to move them with cranes sideways onto the loading area 7.

Figure 4:
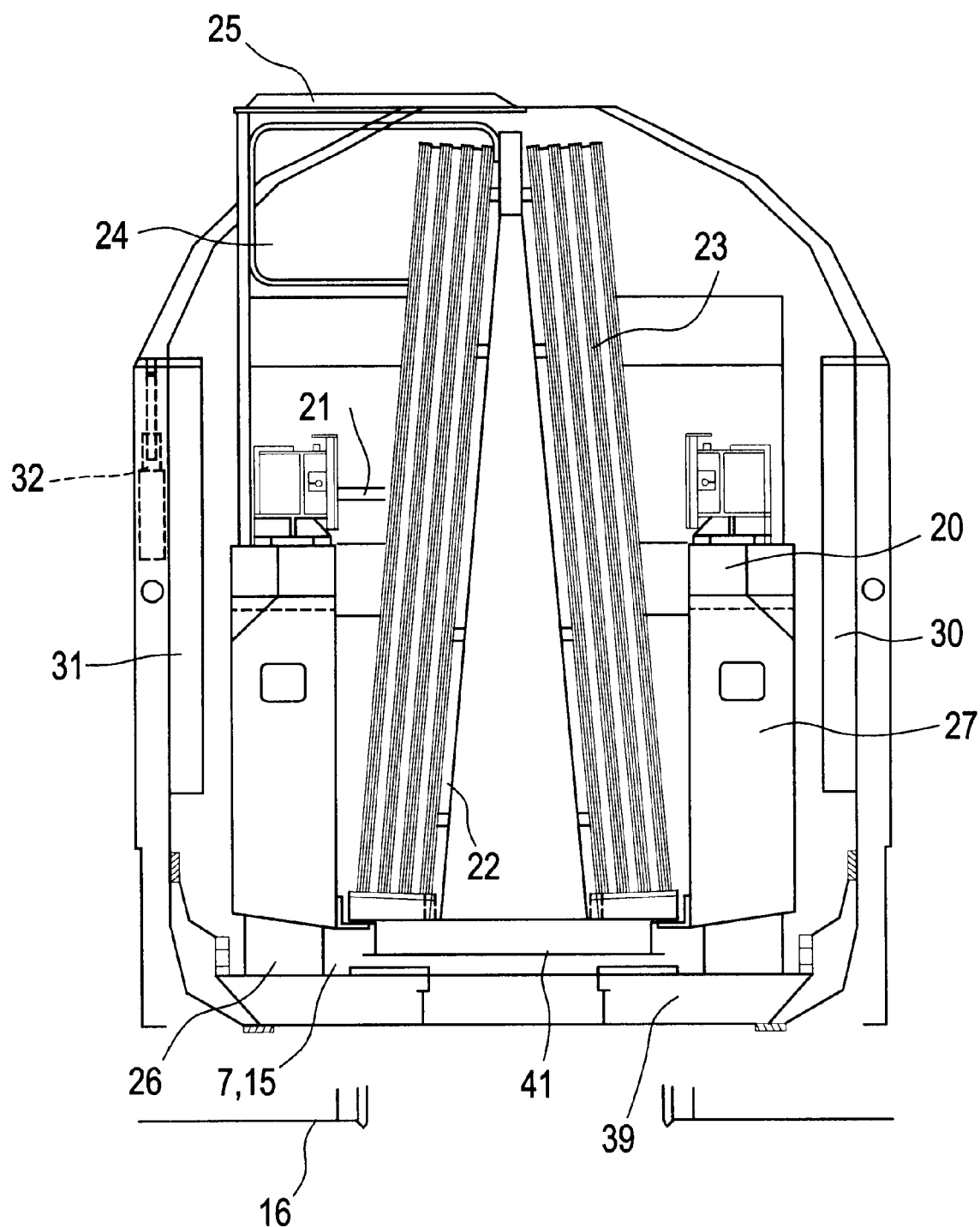
Figure 5:
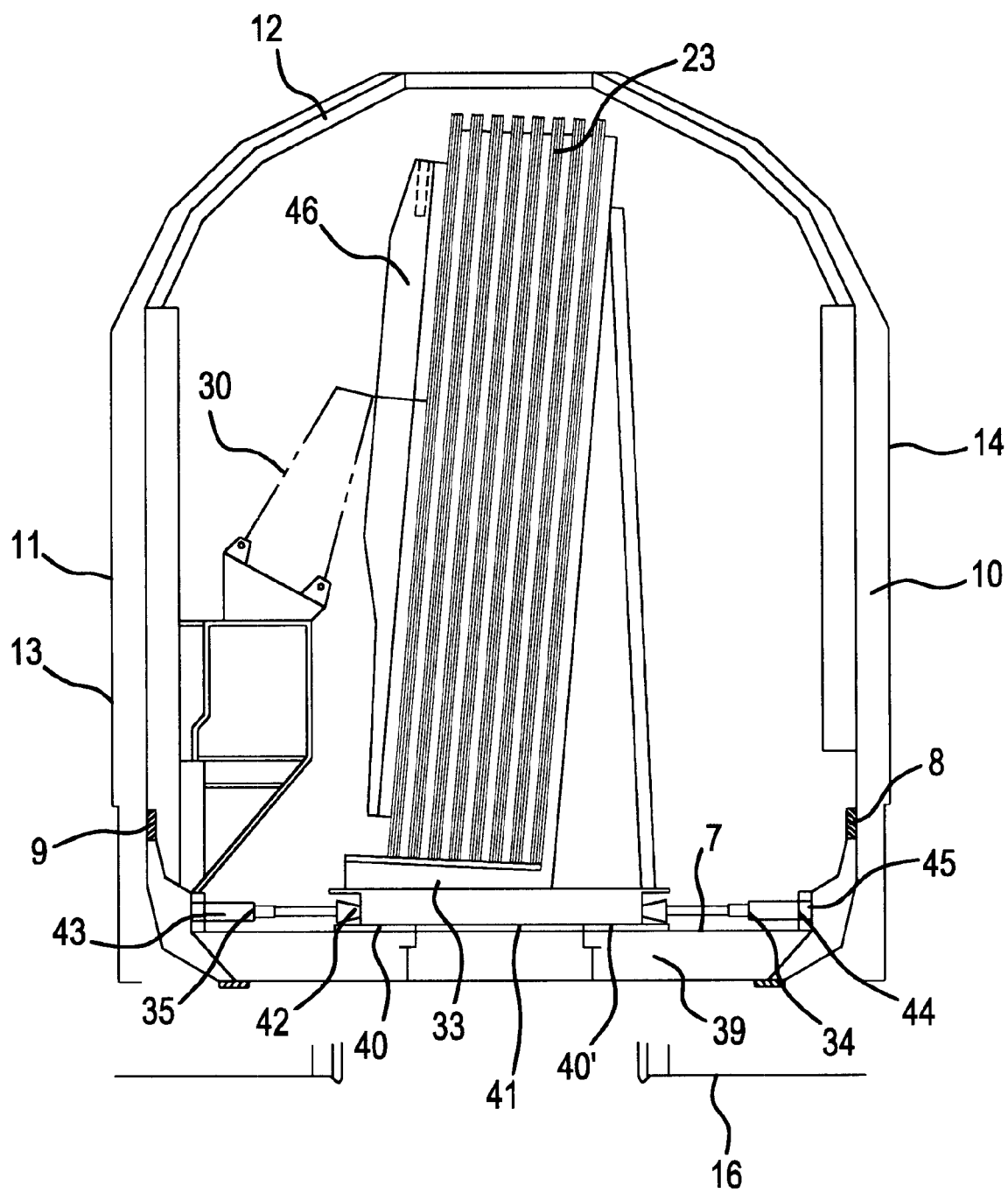
FIG. 5: a low-platform railway car viewed from the front which is loaded with an L-shaped glass stand.

FIG. 4 shows a loading process in progress during which an Osila-glass-transport vehicle 20 is driven in longitudinal direction 38 onto the loading area 7. On the loading area 7 the traveling surface 15 for the Osila-glass-transport vehicle is provided whereas the glass pane packages 23 on the glass stand 22 are held in such a way on the fixating fixtures 21 that they cannot slide during the transport.

It is visible that the entire glass stand 22 holding the glass pane packages 23 is moved by the Osila-glass-transport vehicle across the traveling surface 15 onto the loading area 7 in an elevated fashion to then be set onto the loading area 7.

It is also visible that the Osila-glass-transport vehicle 20 features an elevated driver booth 24 whose protecting roof 25 can feature loading ramps and guiding rails with which the roof 12 of the low-platform railway car 2 can be raised enough at the same time as the vehicle drives onto the railway car so that the roof 12 does not represent a hindrance to the Osila-glass-transport vehicle. The Osila-glass-transport vehicle is fitted with rollers 26 which ensure a gliding transport on the traveling surface 15. Also, the lowering frame 27 can be lowered towards the rollers 26 far enough so that the bottom surface 41 of the glass stand 22, which is here featured as an A-shaped glass stand, can be lowered onto the loading area 7. By proceeding in longitudinal direction 38, the Osila-glass-transport vehicle 20 is freed of the glass stand 22, can again be raised and can be used to transport additional glass stands into the glassworks or can be transported to the client.

It was stated previously, that the roof 12 can be raised above the driver's booth 24 or the protecting roof 25. Besides this lifting construction it is also possible to raise the roof 12 and also lower it with the help of lifting equipment 32 which is located on both side walls 10, 11.

Towards the sides of the side walls 10, 11 there is also a fixture 30, 31 that is securing the loaded goods so that with this fixture 30, 31 the glass pane packages can be fixated similar to when they are transported with the Osila-glass-transport vehicle.

Differing from picture 4, picture 5 shows an L-shaped glass stand 33 which is loaded with a correspondingly larger glass package 23. This L-shaped glass stand 33 also features a U-shaped longitudinal carrier 42, which the correspondingly fitted U-shaped longitudinal carriers of the Osila-glass-transport vehicle 20 can interlink with as shown in detail in picture 4. Those U-shaped longitudinal carriers 42 according to picture 5 are also used to receive the stand fixations 34, 35 which take care of a fixed position of the glass stands 22, 23 after the L-shaped glass stand 33 or the glass stand 22 have been unloaded. According to picture 5, air cylinders 43, 44 are intended for this purpose which for one part link into the U-shaped longitudinal carrier 42 in its braced position as well as link into the U-shaped fixtures 42 in the loading board 8, 9. According to picture 5 a joint 45 can be intended to swivel the air cylinder 43 up when the Osila-glass-transport vehicles 20 are used for the loading and unloading procedure.

Instead of the air cylinders or hydraulic cylinders 43 other braces can be used which work together with the fixture 30, 31 that is securing the loaded goods.

According to picture 5, a more elaborate fixture 30 that is securing the loaded goods is intended, which features a fixating clip 46 that can be swiveled and which works more or less independent from the side walls 10, 11. It rests more on the loading board 8, 9 so that the other part of the structure 14 can be less stable. In order to accommodate the tremendous weight especially of the L-shaped glass stands 33, there are reinforcement boards 40, 40' intended that run in longitudinal direction 38 across the diagonal carriers 39. The reinforcement boards 40 ensure an optimized even distribution of the weight of the glass package 23.

In addition to the design according to picture 5, other designs of fixtures 30, 31 that are securing the loaded goods can be used to secure the glass package 23. With that, it is important that the glass package 23 is held in such a way that the glass panes cannot be damaged while the low-platform railway car is moved. To simplify matters, picture 5 only shows one fixture 30 that is securing the loaded goods. A similar fixture has to be placed on the opposite side because otherwise it cannot be prevented that the entire L-shaped glass stand 33 tips over.

All specified characteristics, as well as those which can be seen on the drawings are regarded by themselves as well as in combination essential to the invention.

What is claimed is:

1. Transport vehicle comprising one or more low-platform railway cars for low-loading and transport of objects comprising an elongated loading area having dimensions corresponding to supporting rails, low-set steering devices coupled to each railway car spaced from each other for supporting each railway car on the rails, loading boards for enclosing the loading area opposite elongated sides, a connecting loading ramp on a head side of the loading area between the loading boards, a short coupling on the head side for coupling each railway car with adjacent railway cars, a protective structure disposed on the loading area for protecting the objects from soiling from below and from all around the loading area and comprising a roof on an upper side of the loading area, the roof having changeable positions to facilitate loading of the objects, diagonal carriers on a lower side of the loading area for supporting bottom surfaces of the objects, reinforcement boards running in longitudinal directions of the loading area and resting on the diagonal carriers, the roof of the protective structure being movable upwards and downwards, stabilizing side walls forming together with loading area bearings for fixtures for securing the objects loaded on the loading area, and stand fixations disposed in the loading area for holding the objects.

2. The vehicle of claim 1, further comprising a loading unit formed by coupling the side walls, the roof, and the loading area to each other with the bearings for the fixtures securing the loaded objects.

3. The vehicle of claim 1, wherein the stand fixations are air cylinders or hydraulic cylinders disposed on one of the loading boards.

4. The vehicle of claim 3, further comprising a U-shaped longitudinal carrier and a glass stand.

5. The vehicle of claim 4, wherein each of the loading boards is disposed on the longitudinal carrier and is swivellable.

6. The vehicle of claim 4, further comprising U-shaped spaces in each of the loading boards and in the glass stand, wherein the stand fixations have double-wedge shapes and are supported in the U-shaped spaces of each of the loading boards and the glass stand.

7. The vehicle of claim 6, wherein the stand fixations are braced between the U-shaped spaces of each of the loading boards and the U-shaped spaces of the stand.

8. The vehicle of claim 1, wherein the roof comprises segments, and wherein the roof is raisable in desired segments.

9. The vehicle of claim 8, wherein the roof further comprises a loading ramp and guiding rails.

10. A vehicle convoy comprising at least two of the transport vehicle of claim 1, wherein the low-platform railway cars are coupled to each other with accordion-shaped covers.

11. The system of claim 1, wherein the objects are heavy objects having large dimensions.

12. The system of claim 11, wherein the objects are glass scaffoldings.

13. A transport system comprising a kneel vehicle for transporting objects comprising a low-level bogie arranged spaced from one another, a rail measure coupled to the bogie, an elongated loading platform on the bogie, boards on opposite elongate sides of the loading platform, a loading ramp connected to rear sides of the boards, a protective enclosure for protecting a loading area from dirt retention from all-around, a roof on the protective enclosure adapted for positioning at different levels to facilitate loading, a coupler on the loading platform for facilitating tight coupling with adjacent kneel vehicles, longitudinal reinforcement beams disposed on crossbars for supporting floor areas of the objects, stabilizing side boards on the loading platform forming a counterfort for loading safety devices and rack holding devices disposed on the loading platform.

14. The system of claim 13, wherein the boards, the roof, and the loading platform are coupled with one another forming a unit with the counterfort for loading the safety devices.

15. The system of claim 13, further comprising rack holding devices formed as pivotable air and hydraulic cylinders at lower sides of the loading board, and U-shaped main girder for supporting the cylinders.

16. The system of claim 15, further comprising U-form cutouts in the loading board and in the rack holding devices or between the loading board and the rack holding devices.

17. The system of claim 16, wherein the rack holding devices are double-wedged devices coupled to the U-form cutouts.

18. The system of claim 13, further comprising segments on the roof wherein the roof is liftable by the segments.

19. The system of claim 13, wherein the roof comprises an approach incline and guides thereon.

20. A vehicle link comprising the transport system of claim 13, wherein at least two of the knee vehicles are coupled to each other with accordion-shaped covers.

* * * * *